US 7,127,326 B2

(12) United States Patent
Lewis

(10) Patent No.: US 7,127,326 B2
(45) Date of Patent: Oct. 24, 2006

(54) CERTAIN PRINCIPLES OF BIOMORPHIC ROBOTS INCLUDING FOOT PLACEMENT SELECTION USING NON-GEOMETRIC VISUAL PROPERTIES

(75) Inventor: Murray Anthony Lewis, Mahomet, IL (US)

(73) Assignee: Iguana Robotics, Inc., Urbana, IL (US)

( * ) Notice: Subject to any disclaimer, the term of this patent is extended or adjusted under 35 U.S.C. 154(b) by 159 days.

(21) Appl. No.: 10/897,400

(22) Filed: Jul. 23, 2004

(65) Prior Publication Data

US 2005/0065650 A1   Mar. 24, 2005

Related U.S. Application Data

(63) Continuation-in-part of application No. 10/706,980, filed on Nov. 14, 2003, now abandoned.

(60) Provisional application No. 60/489,106, filed on Jul. 23, 2003, provisional application No. 60/426,367, filed on Nov. 15, 2002.

(51) Int. Cl.
*G05B 15/00* (2006.01)
*G05B 19/00* (2006.01)

(52) U.S. Cl. .................. 700/258; 700/245; 700/253; 318/368.1; 318/368.11; 318/368.12; 901/1; 901/9; 701/23

(58) Field of Classification Search ............... 700/258, 700/245, 253; 318/568.1, 568.11, 568.12; 901/1, 9; 701/23
See application file for complete search history.

(56) References Cited

U.S. PATENT DOCUMENTS

| 4,744,719 | A | * | 5/1988 | Asano et al. ............. 414/730 |
| 6,317,652 | B1 | * | 11/2001 | Osada ........................ 700/245 |
| 6,917,176 | B1 | * | 7/2005 | Schempf et al. ....... 318/568.11 |
| 2003/0171846 | A1 | * | 9/2003 | Murray et al. .............. 700/245 |

* cited by examiner

*Primary Examiner*—Thomas G. Black
*Assistant Examiner*—McDieunel Marc
(74) *Attorney, Agent, or Firm*—Whitham, Curtis, Christofferson & Cook, P

(57) ABSTRACT

Robots and other mobile apparatus, especially robotic bipeds, that exhibit agile capabilities can become easily destabilized by obstacles or particular surfaces. An algorithm for controlling the movement of a robot based on visual cues and learning processes will help to avoid destabilization and movement interruption by altering the gait measurement. As such, when the robot predicts that an obstacle is upcoming, it can make adjustments by either increasing or decreasing stride so that a smooth transition can be made in bypassing the obstacle.

20 Claims, 10 Drawing Sheets

O=0.00  O=0.25  O=0.5  O=0.75  O=1.0/0.0

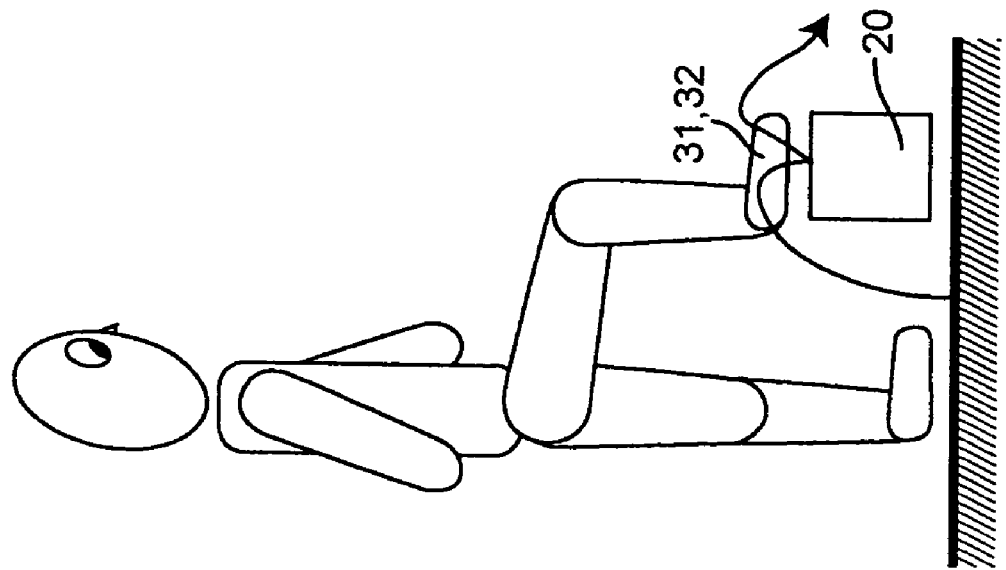
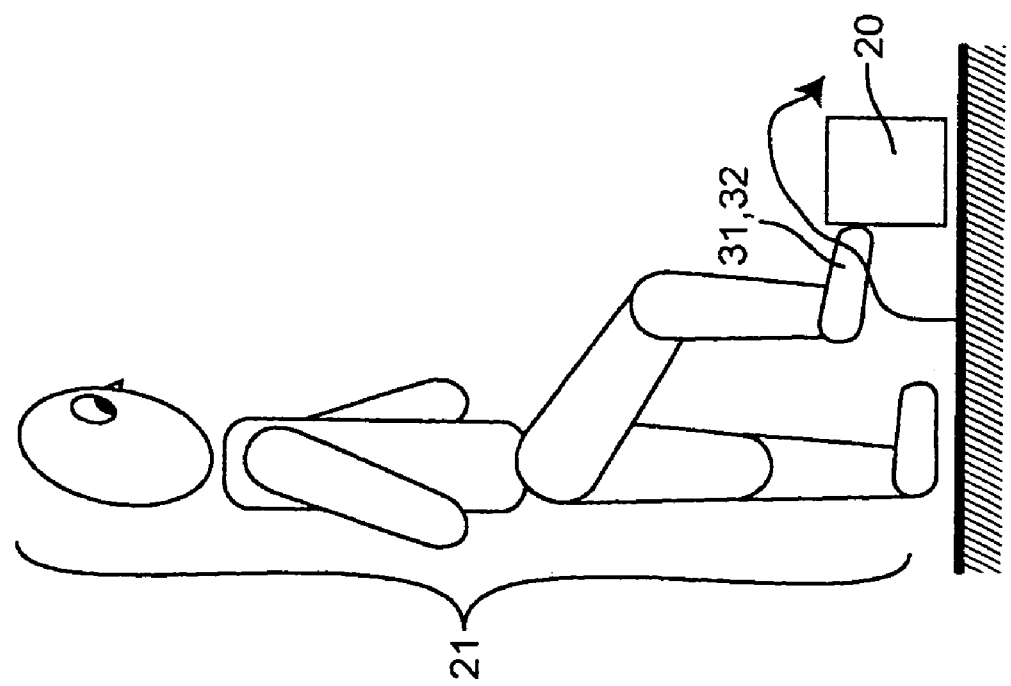

CERTAIN PRINCIPLES OF BIOMORPHIC ROBOTS INCLUDING FOOT PLACEMENT SELECTION USING NON-GEOMETRIC VISUAL PROPERTIES

CROSS-REFERENCE TO RELATED APPLICATIONS

This Application is a Continuation-in-part of U.S. Utility patent application Ser. No. 10/706,980, filed Nov. 14, 2003 now abandoned, which claims priority of U.S. Provisional Patent Application 60/426,367, filed Nov. 15, 2002, both of which are hereby fully incorporated by reference. This application also claims priority of U.S. Provisional Patent Application 60/489,106, filed Jul. 23, 2003, which is also fully incorporated by reference.

BACKGROUND OF THE INVENTION

1. Field of the Invention

The present invention generally relates to methods of designing autonomous mobile robots and more specifically relates to the prediction of the sensory consequences of movement, learning affordances using neural methods, and exploitation of the natural system dynamics to simplify computation and robot control in autonomous robot explorers.

2. Description of the Prior Art

Technology has generally been aimed to make human life easier by taking on the burden of human tasks, or performing tasks that humans cannot perform due to physical constraints. In turn, robots have, and continue to be, developed that are mobile and that have the ability to retrieve or report information in accordance with this technological trend. In other words, robots are being designed to relate to humans while providing them with life simplifying solutions. To meet this goal, robots are taking on forms similar to either humans or animals, for purposes of cognitively and emotionally relating with the technology, as well as for patterning the evolutionary success in mobility of humans or animals (also hereinafter sometimes collectively referred to as biological systems). Additionally, a major reason for choosing a legged form, particularly a two-legged humanoid form, is that humans have built a substantial environment based on human mobility needs. As such, robots using wheels and/or tracks generally do not meet the mobility needs for a variety of terrains where legged robots are generally more successful.

Bipedal locomotion over a flat, firm surface does not require visual or other type of distal sensory apparatus. However, if the environment is varied, vision or other type of distal sense is necessary to adjust gait in an anticipatory manner. Various visual cues are used by animals and humans to guide locomotion. These cues include cues that rely on or exploit the geometry of the environment: optic flow, stereopsis, depth from elevation and others as well as non-geometric cues such as the color, texture and surface patterns of the environment.

Movement of an observer (biological or otherwise) gives rise to motion parallax with objects in the environment. Light reflected or emitted by surfaces in the environment give rise to a pattern of luminosity changes on the observer's retina or imaging surface. This pattern of changing luminosity is optic flow. Optic flow is highly correlated with motion parallax. Through the examination of the optic flow field it is possible to determine time to contact, and structure of the environment, and the movement of the observer, including direction and rotation. The latter phenomenon is sometimes referred to as visual kinethesis in the literature. Scientific studies support the hypothesis that optic flow is essential for navigation of legged and flying biological systems in the environment.

Additional geometric visual cues include stereopsis and depth from elevation. Stereopsis is used to determine visual sensory data about the environment of a biological system by comparing two or more images from slightly different view points, the arrangement of human eyes being the archetypal example. Stereopsis can convey information about the size of an obstacle, although, in humans, it is apparently less important than other modalities for judging distance to an obstacle and is not an essential sensory factor for locomotion. Depth from elevation is yet another visual cue which operates under the assumption that the observer is kinematically connected to the obstacle being observed. Thus, if the observer is connected to a plane, obstacles closer to the observer will appear lower in the visual field than obstacles further away. This simple effect is exploited in biological systems to judge distances to points in the environment. However, these geometric cues alone, although helpful, are not sufficient for advanced locomotion.

Non-geometric visual cues mainly include texture, and color, but also encompass specular reflection or any other surface cue indicating the quality of a surface. These visual cues, when combined with geometric cues, can greatly enhance the success of locomotion as they assist the observer in anticipating surface characteristics. These visual cues aid biological systems in determining what characteristics a surface may exhibit, such as if a surface is slippery (e.g. ice).

The environment can 'suggest' desirable foot placement for navigating a region. FIG. 1 illustrates a stone walkway partially covered by ice and snow; the highlighted gray regions indicate the more favorable locations for foot placement within a reasonable proximity to the path of intended motion. The suggestion for a particular foot placement and the motor action necessary to accomplish this action is called an affordance.

Affordance encompasses how to perform an action but not the actual selection of such an action. The environment presents potential actions or affordances, and a choice is made as to which of the potential actions is the best pursuit. A person, seeing a mug, immediately perceives the many ways to grasp it, although there is no need for intermediate processing of 'what' the object is. Likewise, an animal, seeing a rock, immediately perceives a way to step over it, on top of it, or step around it depending upon the perceived size or shape of the given rock. Affordance perception includes the motor capabilities of the observer. It is also largely linked to learning abilities, for example, if a choice was made to step over a rock that turned out to be too large to successfully maneuver over, and as a result the animal fell, the animal would learn not to try to step over the rock, and use an alternative approach instead. Past research has managed to link affordances to neural substrates in the brain.

A key problem in the deployment of robots is that even the most agile robots, quadrupeds and especially bipeds, lack good affordance processes and can therefore be easily destabilized by obstacles. An affordance has the function of intelligent pattern matching: the current environment is matched to the set of possible motor actions that can be successfully executed by the animal or machine at a given time instant. This pattern matching can be quick and is superior in speed to methods that rely on algorithmicly driven geometric motion planning.

Vision can assist in stabilizing the subject's relationship to the environment, as well as being essential for navigation, route adjustment and planning. Without vision, the situation is worsened as the robot moves faster and has less time for appropriate planning based on alternate sensory cues (e.g. tactile). It is desirable to replicate animal visual sensory ability in robots to learn affordances and react to the surrounding environment using the previously described geometric and non-geometric methods. A method for achieving this must be resolved for robots to ensure successful mobility within a given environment.

Currently, there is surprisingly little work on the tight integration of vision and locomotion. Historically, the two fields have been addressed by largely separate groups of researchers.

Honda and Sony robots use vision for navigation (e.g. moving in the general direction of an obstacle). The Honda Asimo bipedal robot—"biped" for short—walks on two legs and can maneuver up and down stairs, turn, and walk with a reasonable gait. Sony has developed several generations of small quadruped robots called "Aibo", but has also developed a biped robot. Sony's robots are viewed more as "content delivery devices" which playback media content developed by others, similar to a VCR, although exhibiting an appearance that is more human or animal in form.

Robotics has become a field yielding many important applications for the U.S. Military as well. However, past declassified reports that tracked robotic vehicles being used in the field during search and rescue operations following the World Trade Center collapse lacked the required mobility to adequately perform in such applications. Legged robots were recommended following this report for increased mobility.

As such, it is clear that there is a current and rapidly growing interest in legged robotic machines as well as a need for fast algorithms to provide these legged robots with visuomotor coordination.

SUMMARY OF THE INVENTION

It is therefore an object of the present invention to provide a robot that has the ability to simulate the integration of perception with action of biological systems thereby allowing the robot the capability of making visually triggered gait adjustments prior to and during stepping over an obstacle.

It is an additional object of the present invention to provide a robot that has the ability to detect non-geometric stimuli, such as color, texture, or other surface attributes and determine the utility functions resulting from such stimuli.

In order to accomplish these and other objects of the invention, a mobile apparatus is provided comprising at least one distal sensor for detecting an obstacle in at least the mobility path of said mobile apparatus and providing first data, at least one tactile or pressure sensor for determining the stability of the mobile apparatus providing second data, at least one active joint, and an algorithm for integrating perception in accordance with first data and/or second data with action of the joint(s) in performing a cyclic stride and/or adjustment of said cyclic stride to avoid an obstacle.

Further, a method for determining gait adjustments in a mobile apparatus (robot) will be provided whereby said mobile apparatus may bypass an obstacle. The method includes receiving raw visual data, determining what data within the raw data set is novel based on predictions, determining if an obstacle is in the mobility path of the mobile apparatus by associating past patterns recorded by the mobile apparatus with past reflexes using a sensorimotor map, sending determined information to a central pattern generator (CPG) to calculate and dictate motor commands and resultant movement of the mobile apparatus, sending an error signal back to the sensorimotor map in the event that instability is detected by sensors on the mobile apparatus as a result of an obstacle, and learning to associate visual data with emerging obstacles in response to the destabilization of the robot in some way. Destabilization can be detected by analysis of signals from a tactile, pressure, or even a vestibular sensor, or even a joint sensor that senses a displacement or the limb from an expected trajectory.

BRIEF DESCRIPTION OF THE DRAWINGS

The foregoing and other objects, aspects and advantages will be better understood from the following detailed description of a preferred embodiment of the invention with reference to the drawings, in which:

FIGS. 8a and 8b are diagrams illustrating stumble correction reflex and stride correction.

FIG. 9b is a schematic representation of the structure of weights in FIG. 9a.

DETAILED DESCRIPTION OF A PREFERRED EMBODIMENT OF THE INVENTION

Figure 1:
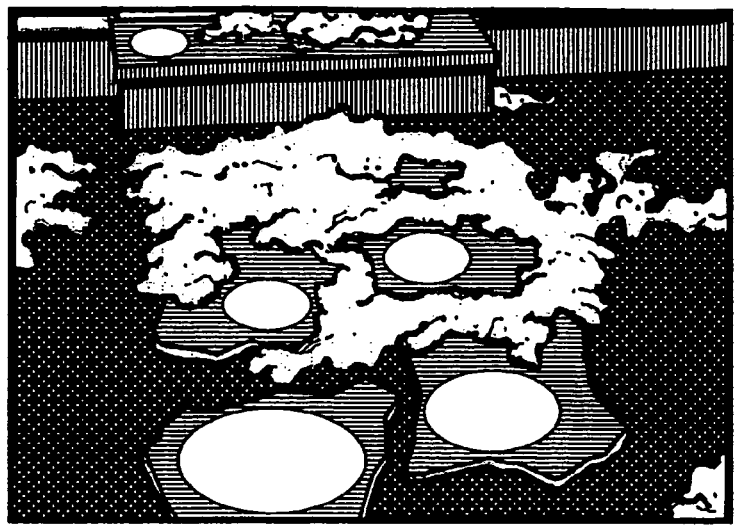
FIG. 1 is a photograph of a walkway with obstacles, affordances for foot placement are highlighted.
Figure 2:
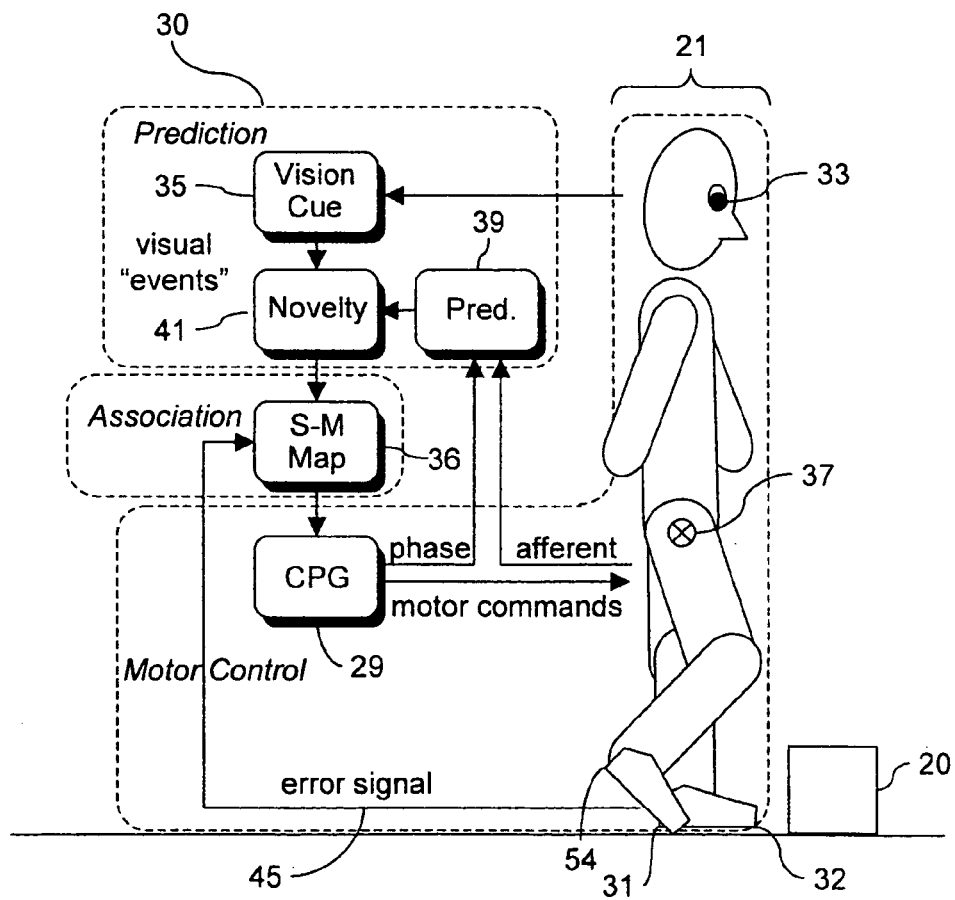
FIG. 2 is a schematic view of the process relationships incorporated within the algorithm.

Referring now to the drawings and more particularly to FIG. 2, a schematic view of the an exemplary mobile robotic biped 21 or "robot" having at least active hip joints 37 and "feet" 54 shown in relation to an exemplary obstacle 20. FIG. 2 visually demonstrates an algorithm in accordance with the invention that has been successfully employed in a robot 21. The algorithm is developed to model the same learning process and method that biological systems are believed to use for successful mobility. The algorithm consists of an autonomous system such as a Central Pattern Generator 29 (e.g. a distributed system of non-linear limit cycle oscillators that generate the necessary pattern of control signals for limb movement), a pseudo-cerebellum 30 that is responsible for predicting sensory perception 39 and novel events 41 after receiving vision cues 35 from at least one distal sensor (e.g. a camera, multiple cameras, laser rangefinder, etc.) 33, and a system of "reflexes" 31, 32 that indicates the instability of the robot 21 for learning what constitutes an obstacle 20. This algorithm provides a method of associative learning between the pseudo-cerebellum 30 and the autonomous system (e.g. central pattern generator 29), propagating back through time, learning triggered by the 'reflex system' comprised of sensors 31, 32, 33, thereby learning alternatives to actions, and ranks these actions (e.g. utility functions) to enhance prediction 39. Such utility functions can be provided by an expert in robotics, by examination of human strategies, by analytical methods, or based on a learning algorithm such as reinforcement learning.

The present invention focuses on creating affordance in robots 21 to result in an ability to make visually triggered gait adjustments prior to and during stepping over a small obstacle 20. There are two key desirable behaviors in a robot 21 when surmounting an obstacle: (1) Foot placement adjustment and (2) stepping over the obstacle 20 at the correct time.

The robot 21 faces a demanding perceptual problem in determining what constitutes an obstacle 20 without being explicitly taught as both terrain with and without obstacles produce complex patterns of visual stimuli. In the present invention, an obstacle 20 becomes implicitly defined as any potentially destabilizing element of the environment. If the robot collides with the environment, it must refer back to the Sensorimotor Map 36 to determine what it saw previously and use that information (e.g. as seen in FIG. 3c) to adjust its control system not to make the same mistake again.

Prior to the last steps before going over an obstacle 20, the robot must adjust its foot placement to step smoothly over the obstacle 20. Without these adjustments, the robot may need to break its stride. To avoid such an outcome, the robot must accurately predict a collision with the obstacle 20 and step at the correct time, and integrate the corresponding adjustment with the step cycle to prevent collision or loss of stable posture. This is called the step-over capability. Foot-placement is extremely important in this process, and therefore, a method to provide accurate judgement for, and execution of, foot-placement is highly sought.

Figure 4:
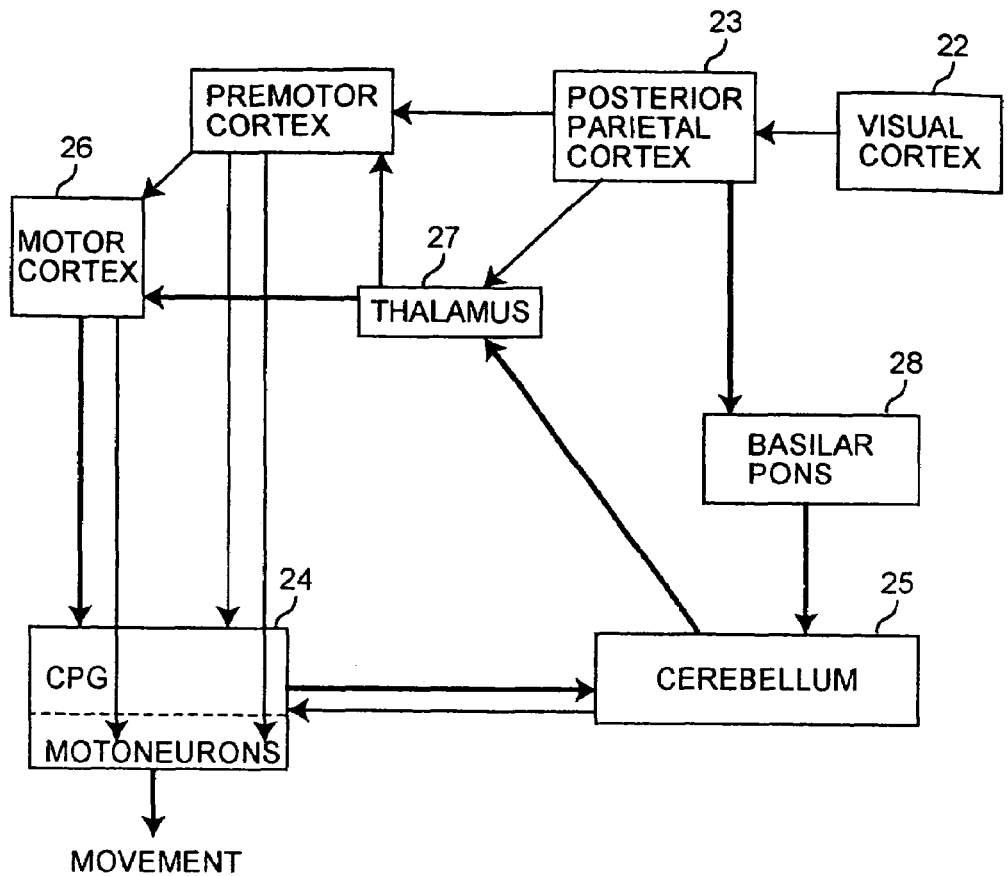
FIG. 4 is a schematic of the brain processes used when integrating perception with action.

FIG. 4 illustrates a possible coordinating architecture for integrating perception with action in the neural system of biological systems. This schematic is based on studies of the cat and primate brain. Information acquired by the visual cortex 22 is sent to the posterior parietal cortex 23 at which point, information is distributed through a variety of coordinating paths to the Central Pattern Generator (CPG) 24, which ultimately results in movement in animals, although it is unclear if humans rely on a biological CPG 24 for locomotion. The spinal circuits (CPGs) 24 create the basic template for movement and send coordinating information to the cerebellum 25. The cerebellum combines sensory information and sends timing and possibly novelty information to the motor cortex 26 by way of the thalamus 27. The motor cortex 26 then modulates the biological CPGs 24 creating a circular method of updating information and movement decisions. Information that is acquired at the visual cortex 22 and is sent to the posterior parietal cortex 23 through the basilar pons 28 to the cerebellum 25 provides the necessary information to the CPG 24 to compute actions and modifications thereof to accommodate features of the environment. It is important to recognize that information flowing between the biological CPG 24, the cerebellum 25 and the motor cortex 26 is used to establish coordination between modulator commands and the ongoing cycle of the CPG. The invention provides an algorithm that artificially emulates how biological systems learn to step over obstacles.

Figure 3A:
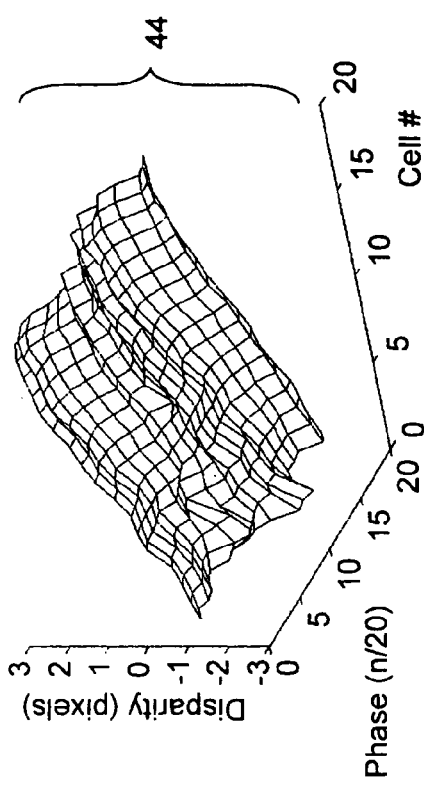
FIGS. 3a, 3b and 3c are graphical interpretations of the data used in the detection of novelty from the right visual field of an exemplary robot.
Figure 3B:
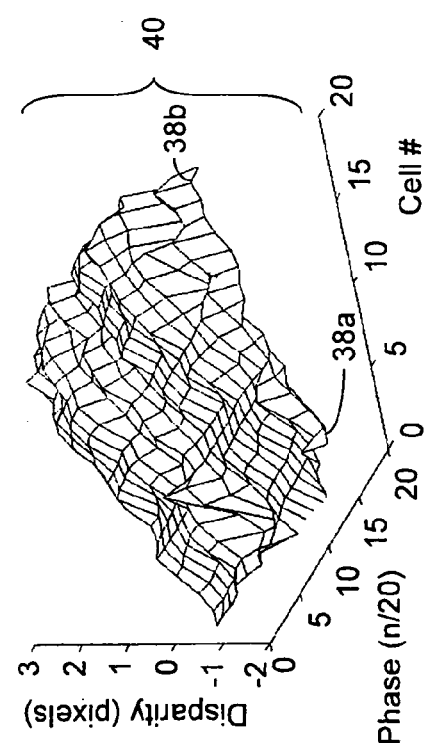
Figure 3C:
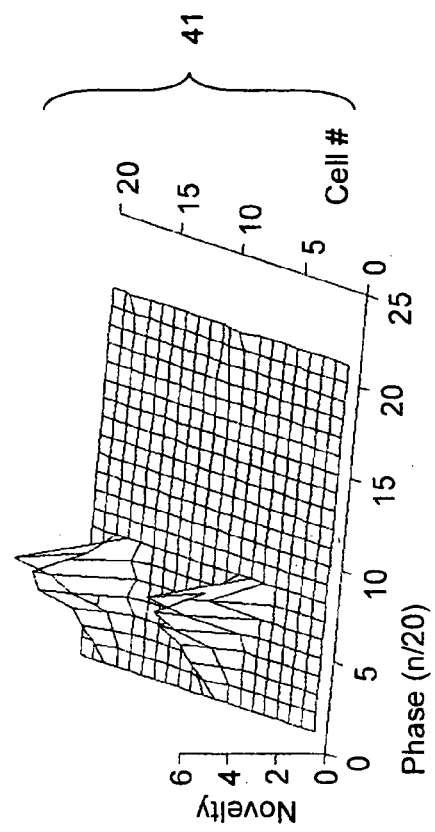

Referring now to FIGS. 3a, 3b and 3c, an exemplary process of dynamic attention mechanism is shown that operates in a way such as to detect unexpected visual stimuli based on the state of all perceptual information and the locomotor controller (e.g. joint commands, tactile, disparity, and phase of gait information). FIGS. 3a, 3b and 3c represent the three key layers of operation of the dynamic attention mechanism: raw data input (FIG. 3a), prediction (FIG. 3b), and novelty detection (FIG. 3c). The process is demonstrated using data from the right side of the visual field only, but the procedure is identical for the left side as well.

Figure 5:
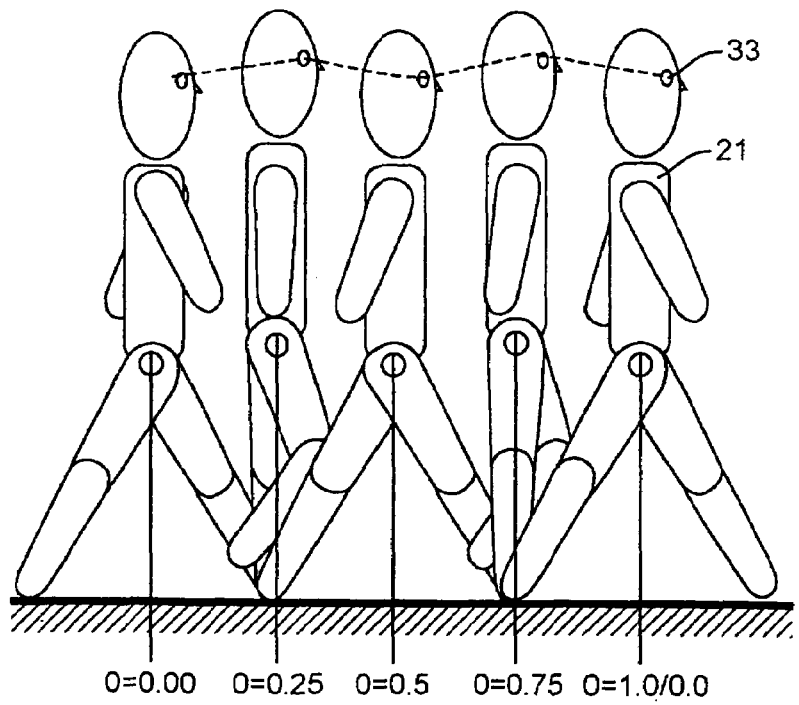
FIG. 5 is a diagram illustrating the change in eye level depending upon the phase of gait.

In the raw data layer shown in FIG. 3a of FIG. 3, the activation of the right vector cells, with eighteen (18) elements, versus phase of gait (described as $\theta$ in FIG. 5), divided into twenty (20) discrete segments (each representing $frax;1;20th$ of a gait *cycle*), for a total of *three-hundred-and-sixty* (360) cells 38. A gait cycle can be defined by assigning an arbitrary point as the beginning of the gait cycle. The unfolding trajectory until the beginning of the next gait cycle (reaching that same arbitrary point of motion) can be parameterized by a single variable called phase. Cells 38 with lower numbers 38a, according to the graph, are closer to the robot whereas cells with higher numbers 38b are further away. The array of cells appears inclined consistent with a view of the surface from above at an oblique angle. Undulation in the phase direction corresponds to viewing height change during walking. Other more random variations thus represent perceived (FIG. 3a) or predicted (FIG. 3b) surface irregularities or possible obstacles.

In an exemplary prediction layer shown in FIG. 3b, the graphical representation of the predicted appearance of a surface is organized in cells 38 by disparity and phase as in FIG. 3a. Each cell 38 receives information about an area of the surface from all sensors 31, 32, 33, (preferably encoded in a sparse code). The weight for each signal is determined by a learning rule (e.g. Widrow-Hoff LMS associative learning rule, etc.). The learning rule chosen is a supervised learning neural network learning rule although it may be possible to achieve the same results with an unsupervised learning rule as well. The primary function of the learning rule is to change the input weights of each cell such that it becomes a better predictor of sensor stimuli as time progresses. The learning rule reduces the weight from sensors with little predictive value and increases those with greater predictive value. The prediction is generated by a weighted average of all sensory and motor data (phase, motor signals (efference copies) tactile sensation, etc.) This adaptation is continuous through the 'life' of the robot 21 as the overall architecture is robust against loss of any sensor modality as all sensory information contributes to prediction of each other sensor.

As arranged in FIGS. 3a, 3b and 3c, an exemplary novelty layer (FIG. 3c), receives the difference between the raw data layer (FIG. 3a) and the prediction layer (FIG. 3b) weighted by a variable gain factor in order to determine an obstacle without being explicitly taught. The gain factor 42 for novelty detection varies due to a local feedback mechanism. The gain adjusts to maintain a low average activity at all times. If a certain cell has little predictive value, the cell's gain is reduced. If other cells predict the actual sensory input very accurately, that cell's gain is increased, allowing finer discrimination. The output function of the novelty layer 41 represents a hard-limit threshold.

Thus, the dynamic attention mechanism, comprising procedural steps shown in FIGS. 3a, 3b and 3c, allows the robot 21 to detect fine environmental features (e.g. an obstacle 20) of 1 cm in height or less whereas without the predictive component of this mechanism, the otherwise same device could not reliably detect obstacles less than 5 cm in height. As such, even small disparities between the actual/perceived (e.g. raw data layer 40) and predicted features (e.g. prediction layer 39), that correspond to just a fraction of a disparity value are recognized as novelty. Disparity has been defined by those well versed in the field of binocular vision and stereopsis as the side to side (horizontal) or up and down (vertical) "difference in the position of similar images in the two eyes . . . and can produce a compelling sensation of three-dimensionality." In this implementation, disparity values can easily vary +/−1 disparity value for a particular cell during walking and 3–4 disparity values between cells. Learning converges quite rapidly using this method such that good predictions and expectancy are obtained within one-hundred-and-twenty (120) seconds after initiation.

Figure 7:
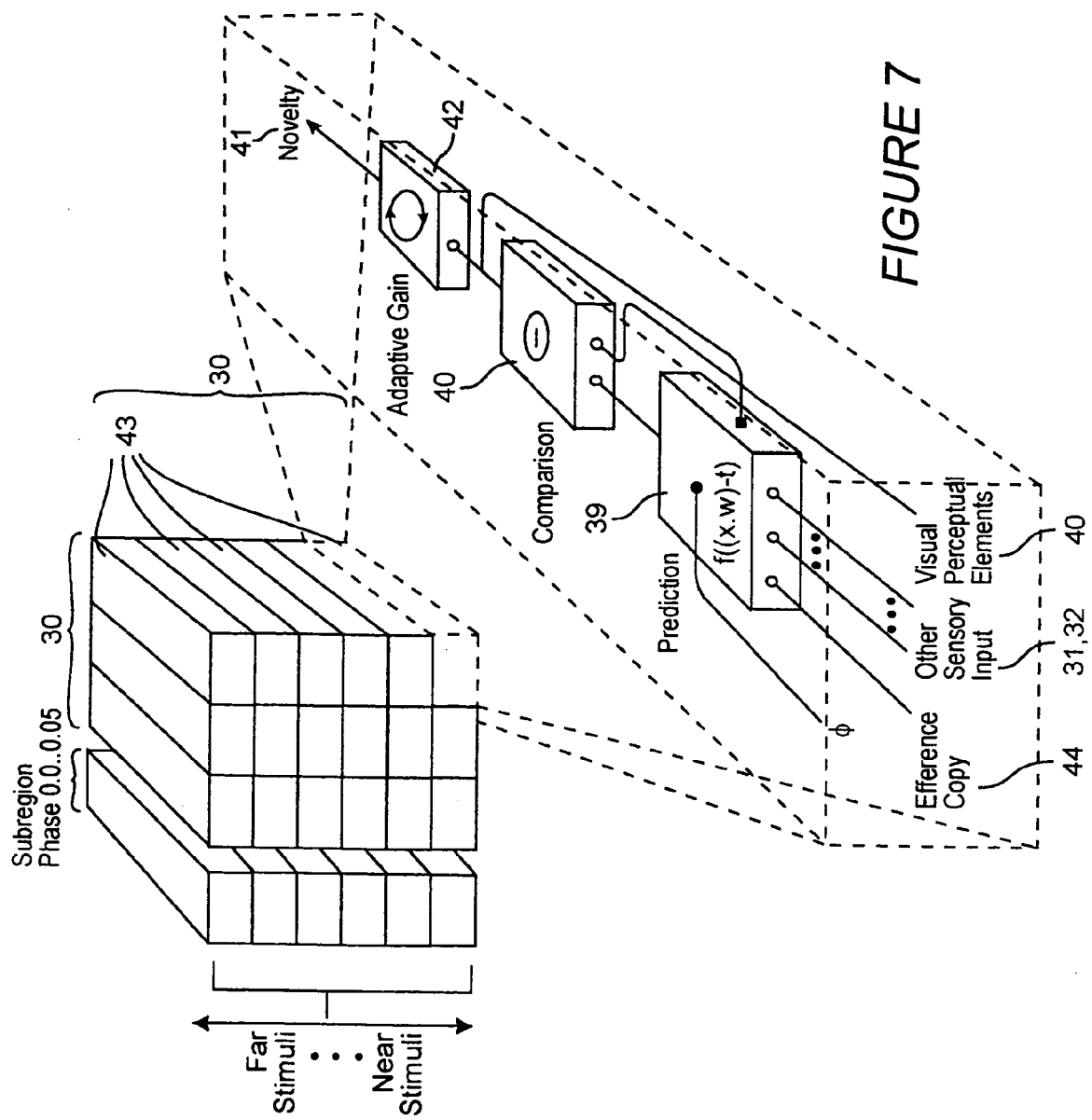
FIG. 7 is an isometric view of a pseudo-cerebellum illustrating the sub-components and functions.

More particularly, FIG. 7 illustrates the pseudo-cerebellum 30 in which the dynamic attention mechanism functions. The pseudo-cerebellum 30 reacts to the information derived from the distal sensor(s) 33 to perform dynamic attention mechanism functions in each of the subregions 43 of the pseudo-cerebellum. Each subregion predicts sensory information based on both visually geometric stimuli including optic flow and other distal cues, as well as tactile stimuli and vestibular stimuli. The stimuli of each subregion 43 is in terms of distance (e.g. near stimuli to far stimuli). Within each subregion 43, prediction 39 is made in consideration of an efference copy 44 and other sensory input 31,32 using the formula $$f((x \cdot w) - t)$$

where f is the neural output, x is a vector of inputs, sparsely coded, w is a vector of weights, and t is a threshold value. The function must have a non-linear form and can be as simple as f(x)=max(0,x), a sigmoidal function or a tanh(x) function.

The prediction 39 is then compared to the actual visual elements where these elements are subtracted from the prediction layer 39 with the results of this difference being reevaluated with the prediction layer 39 and analyzed using adaptive gain 42 in order to determine novelty 41. The adaptive gain works as follows: at each step, two variables are accumulated. One variable indicates the number of times the cell has been active. The other indicates the number of potential times the cell could have been active. The ratio of the two indicates the fraction of times the cell has fired. If this fraction is above a target value, say 0.05 (or 5%), then the threshold for firing is raised by a small increment. If it is below this target threshold, the cell threshold is reduced. In this way, a constant average firing rate is maintained.

After a brief learning period, the robot 21 can accurately predict novelty 41 based on afferent responses. As illustrated in FIG. 2, the information collected by the pseudo-cerebellum 30 using the dynamic attention mechanism is then processed for association using a Sensory Motor Map 36, which can be modified later in the event an error occurs. The sensory data that is referenced as having resulted in that error will then be recognized and avoided to refrain from future repetition of that error. As a result of the robot's learning capabilities and expectancy, the robot 21 also learns to expect a smooth surface in front of it when trained on a smooth surface, and without being explicitly told about smooth surfaces (or a rough surface when trained on a rough surface, without being explicitly taught about rough surfaces).

The same algorithm has been applied particularly to tactile foot prediction and also to vestibular data (e.g. as the ear functions as an organ of balance), using foot pressure sensor(s) 32. By using the same techniques for novelty detection as in the case of visual input, the robot can easily detect an experimenter's light touch or other subtle disturbances (including angular and translational acceleration) during locomotion through the pressure sensor(s) 32.

Vestibular data gives translational and angular accelerations. In animals, angular acceleration is sensed by the semi-circular canals while translational acceleration is sensed by the otolith organs. Likewise, their man made counterparts (translational and angular accelerometers) can sense angular and translational accelerations, and gyroscopes can sense angular velocity.

Finally, based on the information determined in the pseudo-cerebellum 30 and confirmed in the Sensorimotor Map 36, as shown in FIG. 2, the CPG 29 can determine motor commands for the hips 37 to carry out through fixed rotation (e.g. walking); the details of which are not important to the basic principles of the invention. The CPG 29 discussed in FIG. 2 is different from the CPG 24 discussed in FIG. 4 as CPG 29 is artificial and not biological as CPG 24. The biological term has been applied to the artificial CPG 29 for the purpose of this invention as the two are based on the same key idea: that there is a system with a preferred implementation as a distributed system of non-linear oscillators, that can be modulated so as to achieve more than one gait pattern or modulation (or modification) of one or more gait pattern. However, regardless of the actual implementation details, this locomotor controller must generate a signal indicating the Gait Phase in order that the pseudo-cerebellum 30 function in its assigned role.

If, while walking, the tactile sensors 31 or pressure sensors 32 detect an error, the error is routed back to the Sensorimotor Map 36 in order to associate the previous actions and sensor inputs leading up to the error with the given outcome. Through this learning method, the robot 21 will learn how to avoid repeating this error in the future.

Figure 6:
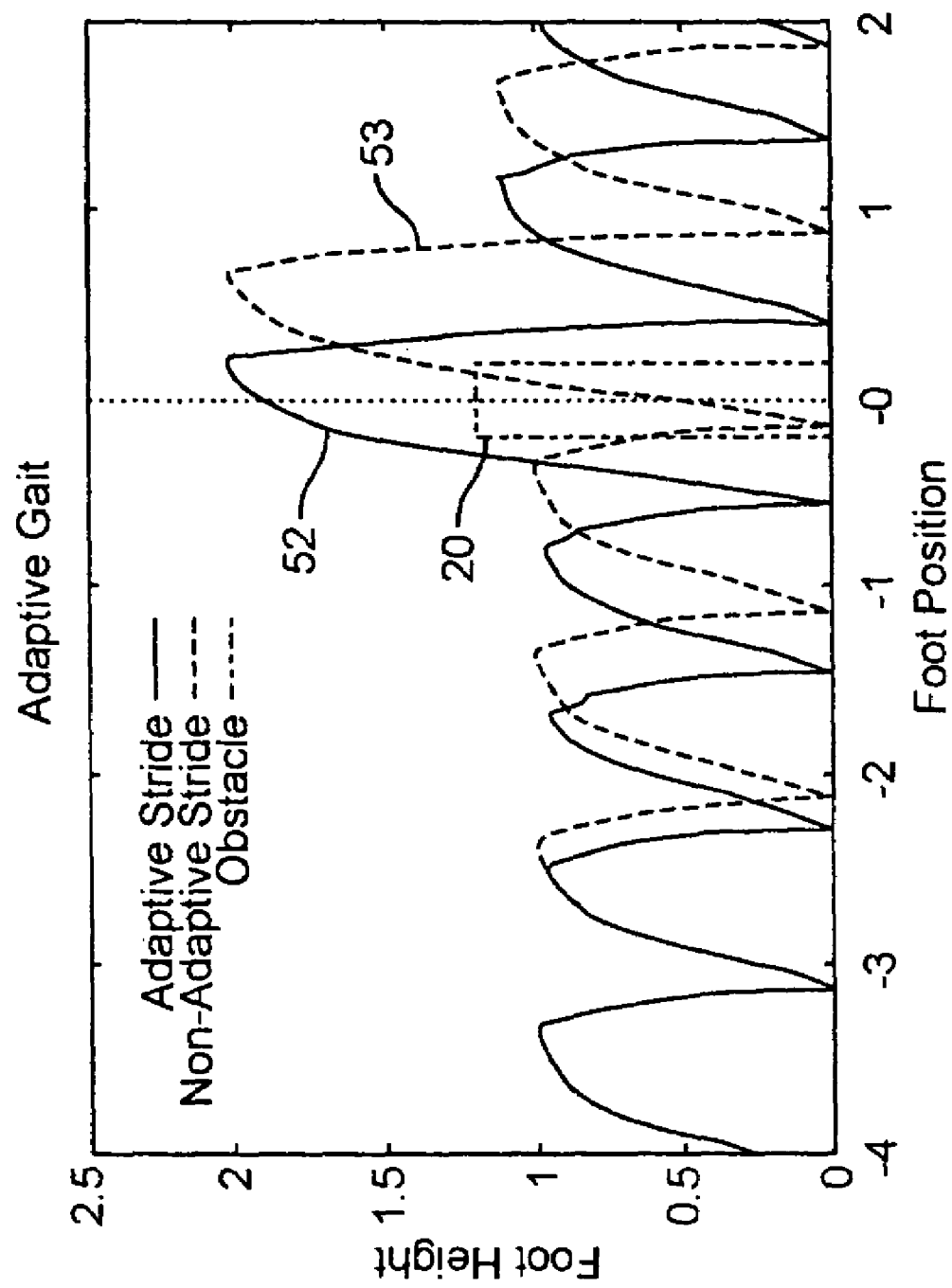
FIG. 6 is a graphical representation of adaptive stride versus non-adaptive stride when approaching an obstacle.

Stride length can be adjusted during locomotion by arranging the CPG 29, learning modules (e.g. prediction 39, and sensorimotor map 36), visual perceptual modules 33, and tactile and pressure reflexes 31 and 32 in algorithmic combination. FIG. 6 exhibits how minor changes can be made to the gait in order to keep stride while successfully stepping over an obstacle (e.g. adaptive stride 52), compared to how the robot would collide with the obstacle if gait adjustments are not made (e.g. non-adaptive stride 53).

The robot 21 can learn to adjust stride length based on an activated novelty cell (e.g. something other than predicted) triggers an eligibility trace. An eligibility trace is a short-term memory delay signal which allows association between future and current events; if the robot's foot collides with the environment, a training signal 45 (representing error) is sent to a sensorimotor mapping mechanism 36 from the novelty cells (shown in FIG. 3c) to a variable that adjusts stride length in the CPG 29.

The response to the training signal 45 can be positive δ+ (increase stride length) or negative δ– (decrease stride length). The actual amount of weight adjustment in the positive or negative direction is a function of the training signal and the eligibility trace. When the training signal is triggered, the resultant stumbling of the robot creates "stumble correction." During a stumble correction reflex, the foot is first brought backward away from the obstacle, and then elevated to avoid collision with the obstacle. As shown in FIGS. 8*a* if the foot collides with the obstacle on the way up, two inference can be made. First, it is likely that the foot should have been placed slightly back from the obstacle. Therefore, the learning algorithm adjusts the sensorimotor map to shorten strides upon encountering a similar obstacle in the future (although, when the collision has already occurred, the robot will lengthen its stride in this situation to bypass the obstacle). Second, the robot should have elevated its foot further than it did. Likewise, in FIG. 8*b*, if the foot collides with an obstacle on the way down, the stride is adjusted so as to completely clear the obstacle and similar obstacles in the future and avoid stepping on the obstacle or a similar obstacle. At the time that the stumble correction is activated in the scenario of FIG. 8*b*, the stride is prematurely terminated (shortened) to step onto the obstacle, however the algorithm for learning will lengthen the stride in future encounters so as to completely clear the obstacle 20, in contrast to the reaction of the stumble correction reflex. In sum, the occurrence of the stumble correction reflex when the foot is on its way up (FIG. 8*a*) or a collision with the obstacle 20 on the foot's way down (FIG. 8*b*) will cause a modification of two sensorimotor maps. One map is to adjust the stride length and the other is to trigger a step over response upon future encounters with similar stimuli. No error feedback is triggered if the robot steps onto the obstacle without becoming unstable.

The purpose of this algorithm is to determine correlations (e.g. maps) between visual input and modulation of the CPG 29 in the same manner as a biological system might process such information so that when an obstacle is detected at a distance along the intended path the robot 21 will gradually adjust its stride length prior to encountering the obstacle 20 in order to be able to step at a sufficient height at the correct time from a suitable location. When practiced correctly, the robot will be able to bypass the obstacle without hesitation or interference. This elegant stepping solution captures key points of biological processes including the spinal/cerebellar/cortical loop, continuous learning throughout life, and direct and efficient mapping between the stages of perception and action. The algorithm can to lead to verifiable predictions in biological and human systems. Currently, evidence exists that humans decrease footfall variance upon approach to an obstacle, yet footfall variance in relation to obstacle height has not yet been confirmed although there is evidence that it will be in the future. As such, when the algorithm is implemented in the pseudo-cerebellum and cycled through the Sensorimotor map, foot placement becomes more tightly controlled the robot gets closer to the obstacle, and with increase of obstacle height.

Figure 9B:
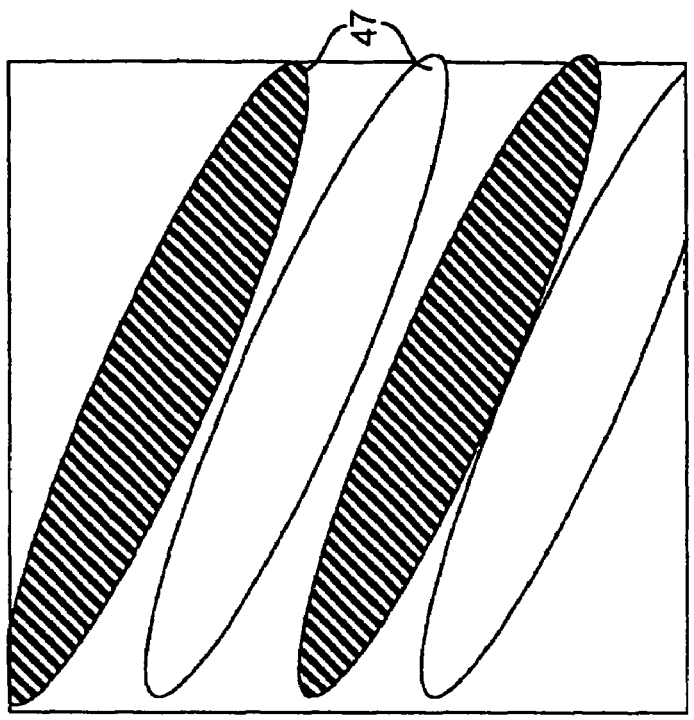
Figure 9A:
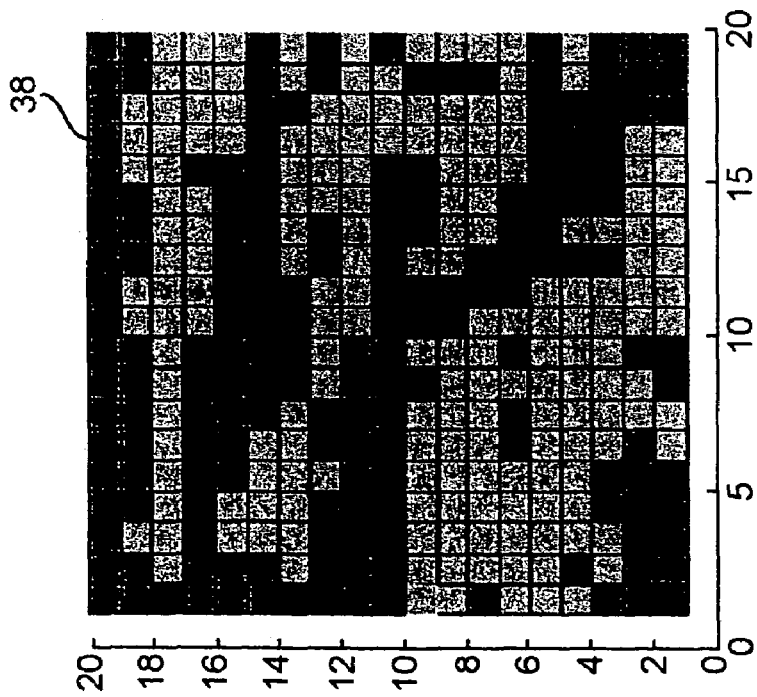
FIG. 9a is a graphical representation of the weights in the sensorimotor transformation function for stride length adjustment, mapping perception to action, after learning has progressed.

After learning a sufficient amount about the environment to accurately determine obstacles in the robot's intended path, a pattern of weights that map the novelty cells to modulation of the locomotor CPG 29 is depicted in FIG. 9*a*. They appear as interleaving bands 46 of positive and negative weights simplified schematically in FIG. 9*b*. Depending on the band that the obstacle appears in, the robot will determine whether it must shorten its stride or lengthen its stride.

The pattern of the weights is reminiscent of spatiotemporal filters for velocity estimation in a 1-D array. However, while the cells are responsive to moving objects, speed is not measured as distance per unit time, but rather, distance per unit phase. Perception 39 is thus scaled to the size of the robot 21. Interestingly, there is no need for calibration of the sensor or motor apparatus for this system to work. The sensorimotor map is developed ab initio, without this information, as would happen in a biological system.

The algorithm of the present invention has particular advantages over other systems. First, it is computationally efficient. The algorithm can be placed in compact customized neuromorphic chips for extremely fast, low power and extremely inexpensive operation. Second, this algorithm learns "what is an obstacle" for a particular robot, automatically adapting to the capabilities of the given platform in regard to its stability or instability. Third, the system can automatically compensate for the up and down movement (or any other periodic movement) of the robot without the need for an image stabilization device. Finally, the system is applicable to any biped and can be extended to robots with a fewer (e.g. monoped hoppers) or greater (e.g. quadruped, etc.) number of legs.

Additionally, as previously discussed, optic flow is the dominant visual sensor and is necessary for successful locomotion in biological systems. However, optic flow has not been used in the past to detect obstacles during legged locomotion. The previously described embodiment manages successful locomotion without using optic flow, whereas an alternate embodiment, described below, incorporates this important sensory technique. In this alternate embodiment, sheer of normal flow field is the perceptual cue, and the robot should halt when aberration in the flow field is detected. In this process, prediction 39 is an optional step within FIG. 7. In experiments, the robots were much more successful in detecting objects of small height (down to 1 cm) using prediction 39, whereas robots not using prediction were fairly comparable in detecting objects having heights of 4 cm or greater but could not recognize objects smaller than 4 cm in height with any reliability. Overall, using optic flow, when combined with prior methods, either with or without prediction, can be successfully used to control locomotion.

The benefits of using geometric sensory data, including optic flow in real robots can be great. The prediction of sensory consequences of movement makes the system much more sensitive to fine features and novelty detection generally makes learning more efficient. The process of incorporating and updating feedback can shape the 'perception' to the motor ability of the observer.

Figure 10:
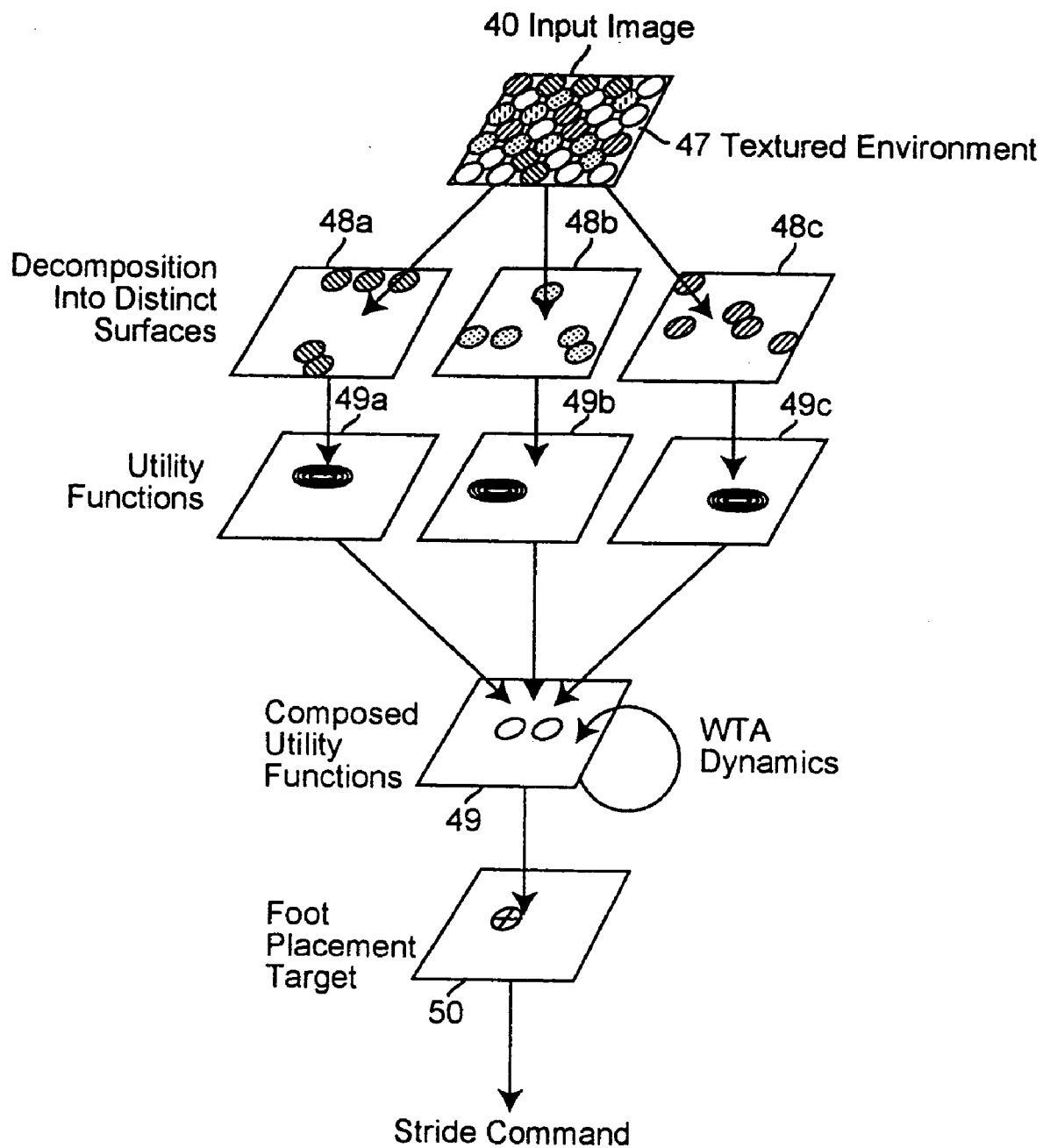
FIG. 10 is a schematic diagram of the process used to determine foot placement based on the surface characteristics of the environment (e.g. texture and color, highlights and any other surface cues.

A perfecting feature or alternate embodiment of the present invention may use geometrical or non-geometrical cues alone or in combination and non-geometric cues may be processed either with or without learning. In the dynamic fusion model as illustrated in FIG. 10, representing this alternate embodiment or perfecting feature, the robot is very sensitive to non-geometric information (e.g. textures or surfaces). The robot takes in an initial image of the textured environment 47, recognizing a variety of textures (e.g. by any known feature recognition or extraction technique, and separates these various textures into distinct surfaces 48, determining all of the areas exhibiting each texture separately. The robot can then determine a utility function 49 for each of the textured groups (e.g. stable, slippery, etc.) The robot will then recombine the textured surfaces into an image based on the utility functions 49 and their usability.

Based on this information, the robot 21 can determine foot placement targets 50 and then activate the stride command to navigate the area.

Figure 11A:
FIG. 11a is a photograph of an exemplary walkway with obstacles.
Figure 11B:
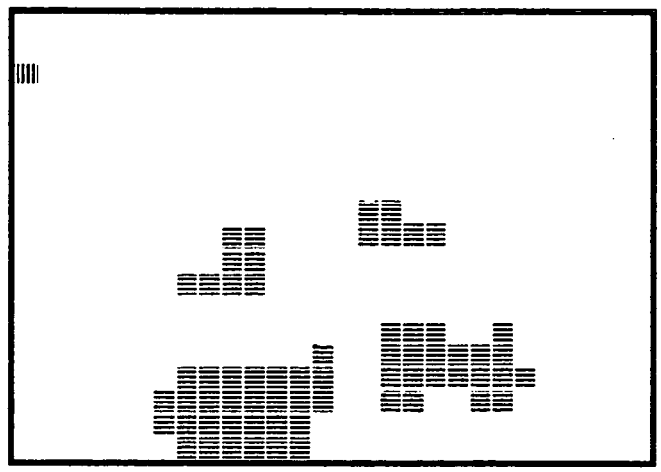
FIG. 11b shows the area of the exemplary walkway that presents desirable footfalls based on image segmentation.
Figure 11C:
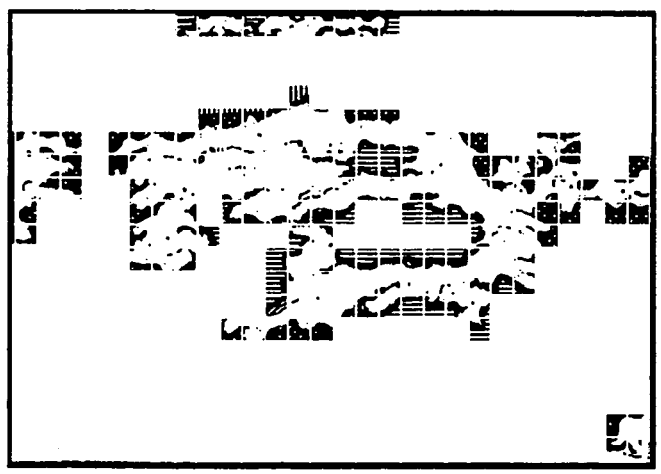
FIG. 11c shows the areas of the exemplary walkway that present obstacles based on image segmentation.
Figure 12:
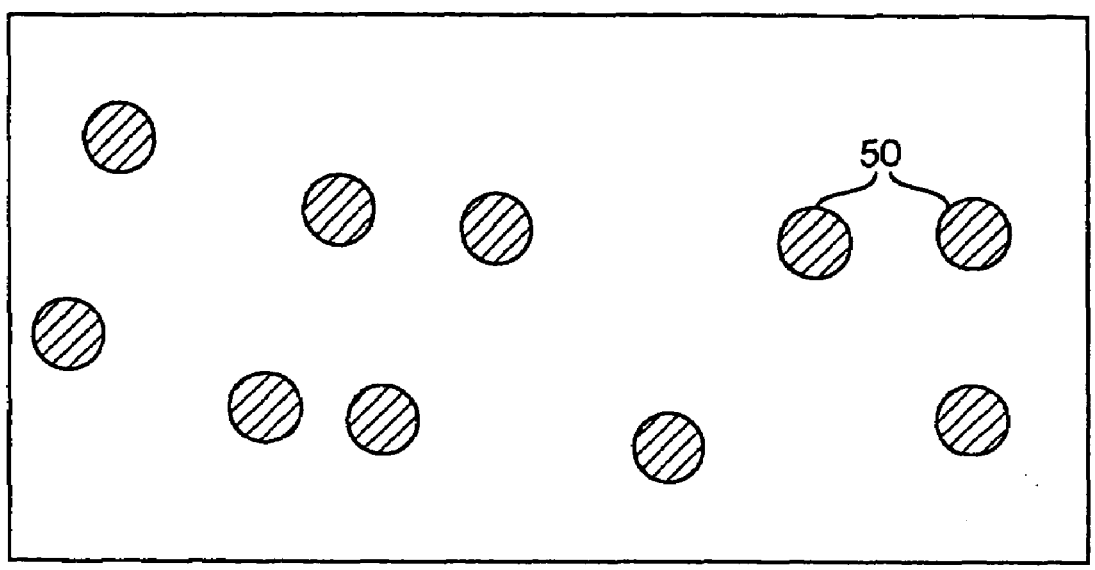
FIG. 12 is a diagram showing a typical test track with "good" surfaces for foot placement illustrated as circles.
Figure 13:
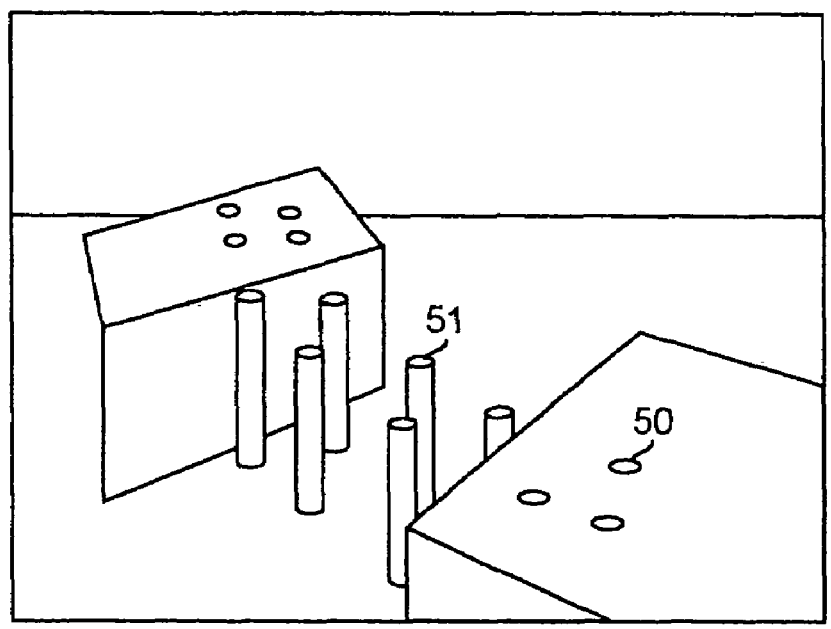
FIG. 13 is an illustration of sparse footholds available for a robot to cross a gap.

This concept is further illustrated in FIG. 11a, 11b, and 11c, where the robot takes in an initial image FIG. 11a, recognizes the desirable fool-falls present in FIG. 11a and isolates them in FIG. 11b (e.g. stones), as well as the isolating the obstacles in FIG. 11c (e.g. snow). This method can be carried out on a typical test track as shown in FIG. 12 where the circles or targets 50 represent "good" surfaces for foot placement, where the targets are arranged at non-regular intervals. In tests, robots were able to utilize the targets 50 with great accuracy, with all errors being attributed to mechanical errors in the robots, and not with the technique itself. This technique can also be used to walk across a gap using sparse footholds 51 as shown in FIG. 13.

Benefits of using non-geometric sensory data are very important to the improvement of robotic mobility. Using non-geometric sensory data, a robot can incorporate n-possible regions (as in a real biological system) as well as predicting bifurcation in motor performance. Additionally, the robot can support dynamic incorporation of surfaces and obstacles into utility functions. For example, consider a robot on a smooth surface with a small gap of ice between the robot and a firm foot hold. In this case the robot will step over the ice. If the gap of ice between the robot and the next solid foothold were to increase to a recognizably critical width, the robot, using the algorithm, will suddenly choose to make short careful steps on the ice rather than a long step to the solid surface. At this crtical point, the robot judges a small step on the ice to be as risky, or more so, as making an exaggerated long step to a solid surface.

The particular manner in which geometrical and non-geometrical cues are combined is not, itself, important to the basic principle of the invention in allowing a robot to accommodate particular obstacles or other features of the environment. However, it is generally the case that geometrical cues are principally processed for distinguishing and avoiding potentially destabilizing features of the environment (e.g. unsuitable foot placement locations) in an anticipatory manner which maintains the efficiency of gait while non-geometrical processing has particular utility in determining suitable locations for foot placement, generally in substantially real time for individual steps. Therefore, the availability of use of both types of cues, as provided by the invention, provides a powerful tool for enhancing robotic ambulatory performance in a wide variety of environments.

In view of the foregoing, the described embodiments have the capability to visually adjust movement in a computationally efficient manner, determining where obstacles lie, and learning how to form affordances to respond to the obstacles effectively without requiring explicit teaching of the obstacle or the environment.

While the invention has been described in terms of a single preferred embodiment, those skilled in the art will recognize that the invention can be practiced with modification within the spirit and scope of the disclosed invention.

Having thus described my invention, what I claim as new and desire to secure by Letters Patent is as follows:

1. A mobile apparatus comprising:
   at least one first sensor for detecting an obstacle in at least the mobility path of said mobile apparatus and providing first data,
   at least one second sensor for determining the stability of said mobile apparatus and providing second data,
   at least one active joint, and
   an algorithm for integrating perception in accordance with at least one of said first data and said second data with action of said joint in performing a cyclic stride and/or adjustment of said cyclic stride to avoid an obstacle.

2. A mobile apparatus as recited in claim 1 wherein said first sensor is a distal sensor and records visual sensory stimuli using at least one of the methods of optic flow, stereopsis, and depth from elevation.

3. A mobile apparatus as recited in claim 2 wherein said distal sensor is at least one of a camera, a laser range finder, ultrasonic range finder, radar, or at least two stereo cameras.

4. A mobile apparatus as recited in claim 1 additionally comprising at least one 'foot' wherein said at least one second sensor for determining the stability of the apparatus is located on said 'foot'.

5. A mobile apparatus as recited in claim 4 wherein said second sensor is at least one of a tactile sensor, pressure sensor, or vestibular sensor, or multiple second sensors comprising a combination of tactile, pressure, and/or vestibular sensors can be used.

6. A mobile apparatus as recited in claim 1 wherein said algorithm utilizes:
   an autonomous system of limit cycle oscillators that generate the necessary pattern for limb movement,
   a pseudo-cerebellum, and
   a reflex system that recognizes instability of said mobile apparatus using said at least one first or second sensor for learning what constitutes an obstacle.

7. A mobile apparatus as recited in claim 6 wherein
   said first sensor is at least one of a camera, a laser range finder, ultrasonic range finder, microwave, ultrasound, radar, or at least two stereo cameras, and
   said second sensor is at least one of a tactile sensor, pressure sensor, or vestibular sensor, or in the event of multiple second sensors, a combination of tactile, pressure, and/or vestibular sensors can be used.

8. A mobile apparatus as recited in claim 7 wherein said autonomous system is a system capable of generating a periodic gate.

9. A mobile apparatus as recited in claim 7 wherein said system is capable of generating a periodic gate is a CPG.

10. A mobile apparatus as recited in claim 7 wherein the pseudo-cerebellum performs the functions of comparison, adaptive gain, and novelty determination based on visual perceptual elements recognized by said at least one first sensor.

11. A mobile apparatus as recited in claim 10 wherein the pseudo-cerebellum performs the additional function of prediction based on other sensory stimuli and an efference copy.

12. A mobile apparatus as recited in claim 1 wherein said algorithm is located on a compact customized neuromorphic chip.

13. A method for determining gait adjustments in a mobile apparatus thereby allowing said mobile apparatus to bypass an obstacle including;
   receiving raw visual data,
   determining what data within said raw data set is novel based on predictions,
   determining if an obstacle is in the mobility path of said mobile apparatus by associating past patterns recorded by said mobile apparatus with past reflexes of said mobile apparatus using a sensorimotor map,
   sending determined information to a central pattern generator (CPG) to calculate and dictate motor commands and resultant movement of said mobile apparatus, sending an error signal back to the sensorimotor map in the event that instability is detected by sensors on said mobile apparatus as a result of an obstacle, and learning to associate visual data with emerging obstacles in response to data acquired by at least one first sensor and at least one second sensor.

14. A method as recited in claim 13 wherein said first sensor is a distal sensor and records visual sensory stimuli using at least one of the methods of optic flow, stereopsis, depth from elevation and is at least one of a camera, a laser range finder, an ultrasonic range finder, radar, microwave, ultrasound, or at least two stereo cameras.

15. A method as recited in claim 13 wherein said second sensor is at least one of a tactile sensor, pressure sensor, or vestibular sensor.

16. A method as recited in claim 13 wherein said raw data includes geometric information only including one or more of the following visual cues:

optic flow, stereopsis, and depth from elevation.

17. A method as recited in claim 13 wherein said raw data includes non-geometric information including at least one of the following visual cues indicating the quality of a surface:

surface texture, surface color, surface pattern, and specular reflection, wherein utility functions for multiple surfaces can be determined from said at least one non-geometric visual cue.

18. A method as recited in claim 17 wherein said raw data further includes geometric information derived from at least one of the following geometric visual cues:

optic flow, stereopsis, and depth from elevation.

19. A method as recited in claim 13 wherein said error signal is triggered by at least one non-distal sensor located on a 'foot' of said mobile apparatus, a stumble reflex is engaged.

20. A method as recited in claim 19 wherein said error signal is triggered when the foot is mobile in the upward direction and engaging said stumble reflex, wherein the stride of the mobile apparatus will be lengthened during the encounter to maneuver past the obstacle, but will learn to shorten the stride to secure foot placement directly before the obstacle and bring the foot to a greater height upon passing an obstacle on a similar future encounter, and said error signal is triggered when the foot is mobile in the downward direction and engaging said stumble reflex, wherein the stride is prematurely terminated to rest said 'foot' on said obstacle during the encounter to maneuver past the obstacle, but will learn to lengthen said stride on a similar future encounter with a similar obstacle in order to clear the obstacle fully in one stride.

* * * * *